Feb. 16, 1943.    M. A. MATHYS    2,310,977
MACHINE TOOL
Filed Aug. 3, 1940    8 Sheets-Sheet 1

INVENTOR
Max. A. Mathys
By Parker, Carlson, Pegner & Hubbard
ATTORNEYS

Feb. 16, 1943.　　M. A. MATHYS　　2,310,977
MACHINE TOOL
Filed Aug. 3, 1940　　8 Sheets-Sheet 4

INVENTOR
Max. A. Mathys
By Parker, Carlson, Pitzner & Hubbard.
ATTORNEYS

Feb. 16, 1943. M. A. MATHYS 2,310,977
MACHINE TOOL
Filed Aug. 3, 1940 8 Sheets-Sheet 5
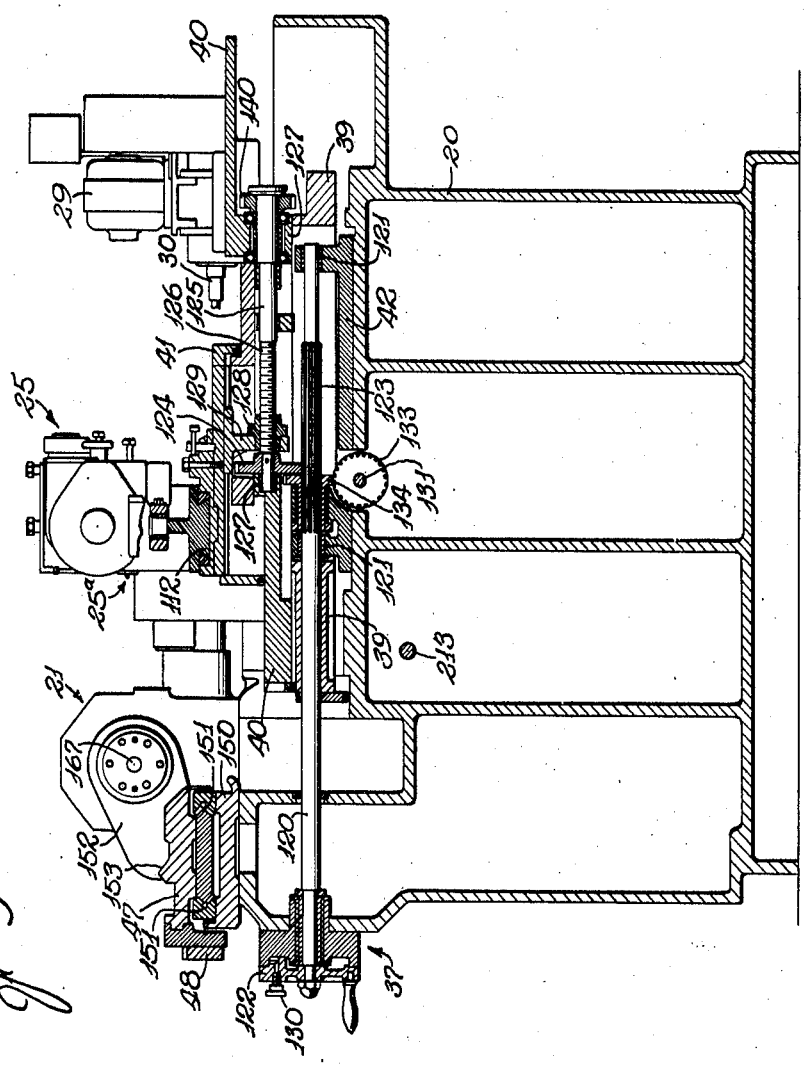
INVENTOR
Max. A. Mathys
By Parker, Carlson, Pitzner & Hubbard
ATTORNEYS

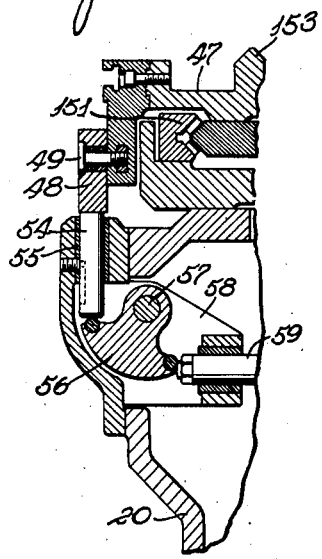
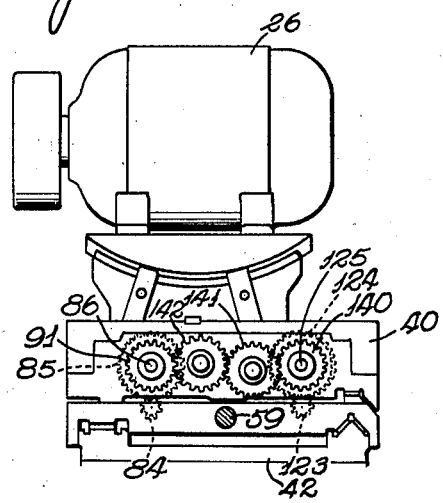
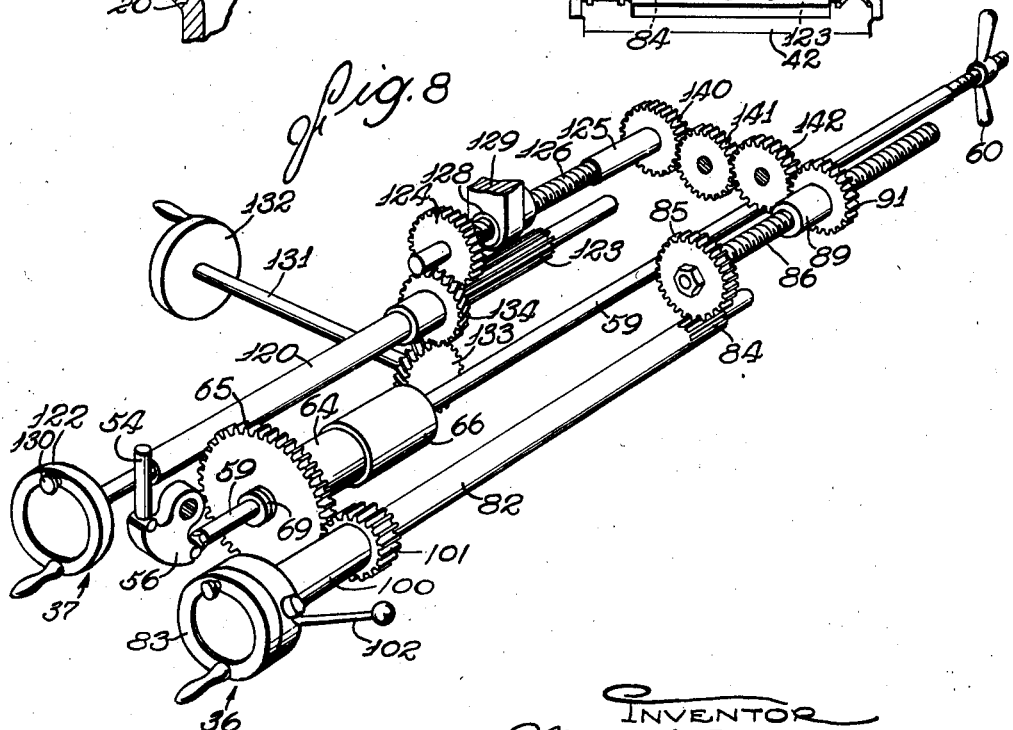

Feb. 16, 1943. M. A. MATHYS 2,310,977
MACHINE TOOL
Filed Aug. 3, 1940 8 Sheets-Sheet 7
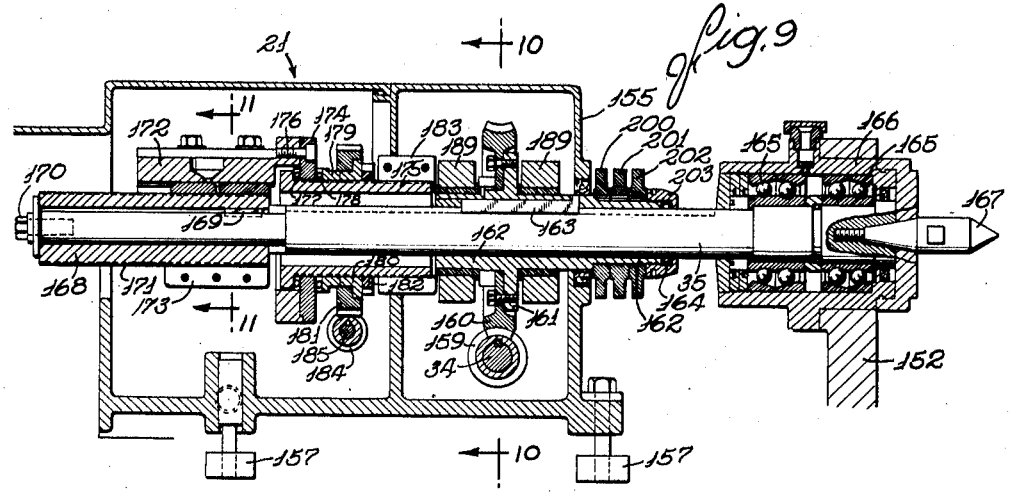
INVENTOR
Max. A. Mathys
By Parker, Carlson, Pigue & Hubbard
ATTORNEYS

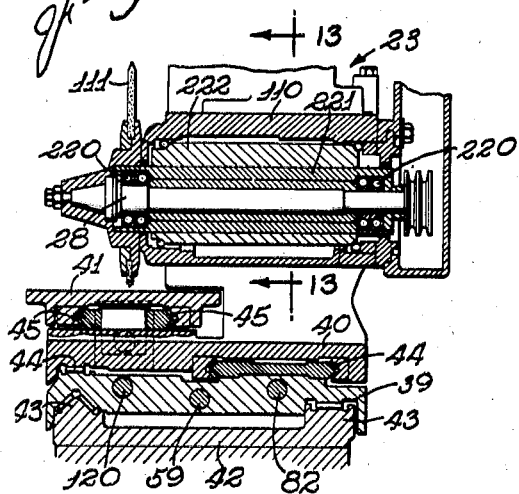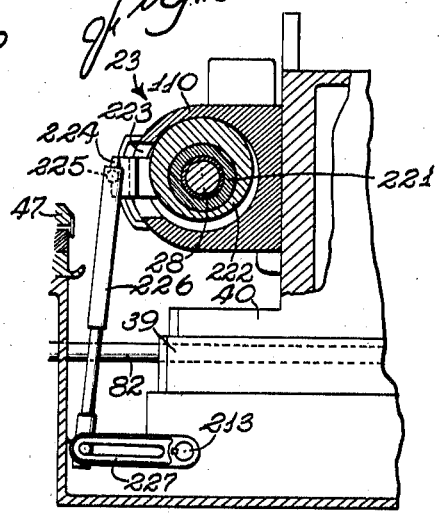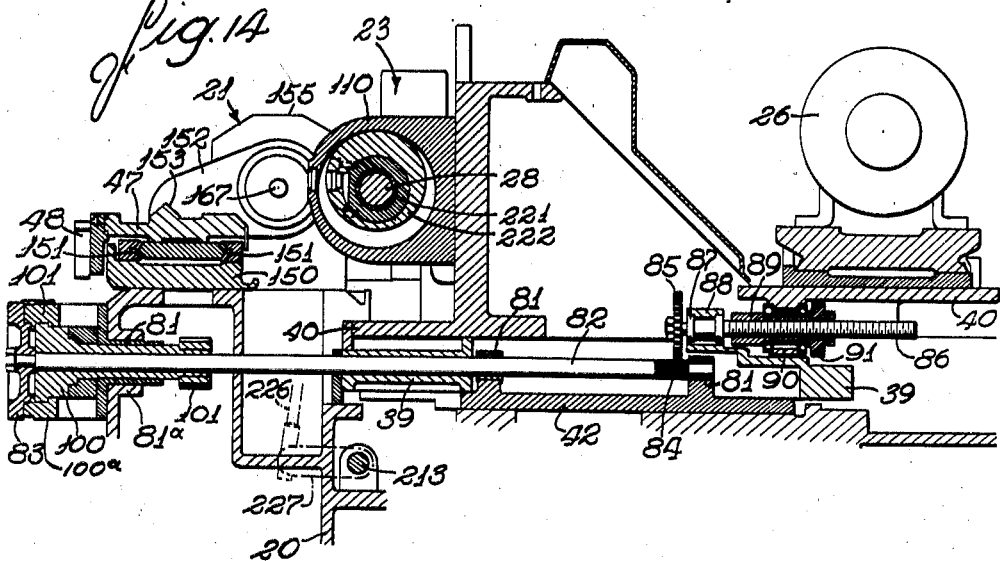

Patented Feb. 16, 1943

2,310,977

UNITED STATES PATENT OFFICE 2,310,977

MACHINE TOOL

Max A. Mathys, Detroit, Mich., assignor to Ex-Cell-O Corporation, Detroit, Mich., a corporation of Michigan Application August 3, 1940, Serial No. 350,348

20 Claims. (Cl. 51—95)

The invention relates to improvements in machine tools for performing material cutting operations, and has particular reference to a new and improved machine for grinding screw threads.

One object of the invention is to provide a novel machine of this character adapted to grind either straight or taper screw threads and embodying novel means for positively maintaining the grinding wheel in a predetermined relation to the work regardless of changes in the wheel diameter resulting from repeated dressing or truing of the grinding wheel.

Another object is the provision in such a machine tool of novel means for effectively controlling in a simple manner the relative movements of the grinding wheel to one workpiece or a number of workpieces during repeated cutting strokes or passes interrupted by wheel dressing operations without change of the machine setting which determines the final workpiece size.

A further object is to provide new and improved means for producing the movements of the grinding wheel relative to the work in grinding straight or taper screw threads, and relative to a wheel dressing device while maintaining a predetermined relation of the grinding wheel and workpiece, including a novel interconnected relation of superimposed slides arranged for conjoint and independent movement.

Other objects and advantages will become apparent in the following description and from the accompanying drawings, in which:

Fig. 5 is a vertical sectional view taken substantially along the line 5—5 of Fig. 1.

Fig. 6 is a sectional view illustrating a detail of the mechanism which controls the movement of the grinding wheel in cutting a taper thread and is taken along the line 6—6 of Fig. 3.

Fig. 7 is a fragmentary rear view illustrating certain gearing.

Fig. 8 shows in perspective and somewhat diagrammatically the means for controlling the relationship of the grinding wheel and the dressing device.

Fig. 9 is a view in vertical axial section through the work head or headstock and is taken along the line 9—9 of Fig. 2.

Figs. 10 and 11 are transverse sectional views through the work head or headstock taken along the lines 10—10 and 11—11 respectively of Fig. 9.

Figure 3:
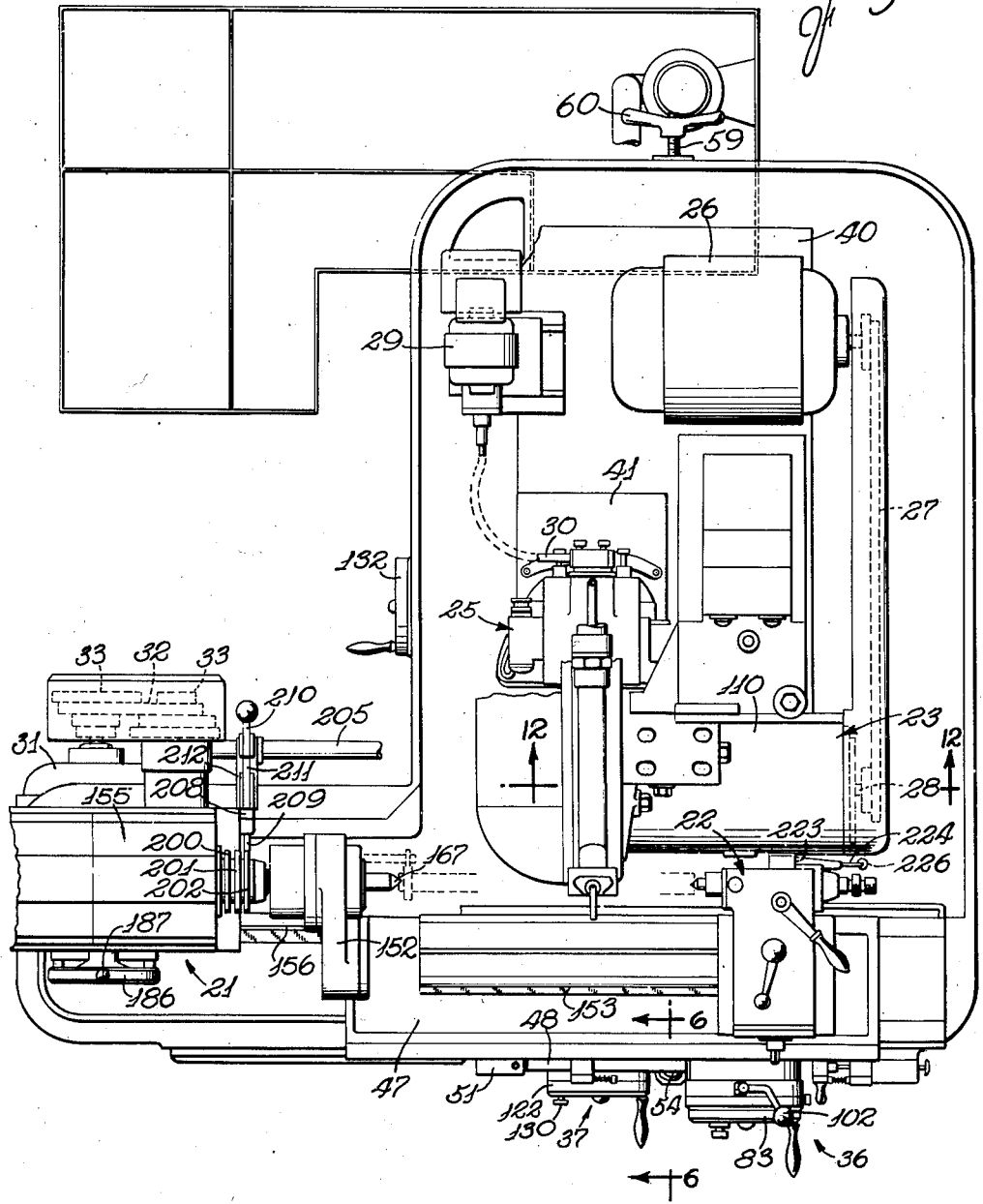
Fig. 3 is a plan view of the machine.

Fig. 12 is a partial sectional view taken on a vertical plane through the axis of the grinding wheel spindle along the line 12—12 of Fig. 3.

Fig. 13 is a transverse sectional view through the grinding wheel spindle assembly taken along the line 13—13 of Fig. 12.

Figure 1:
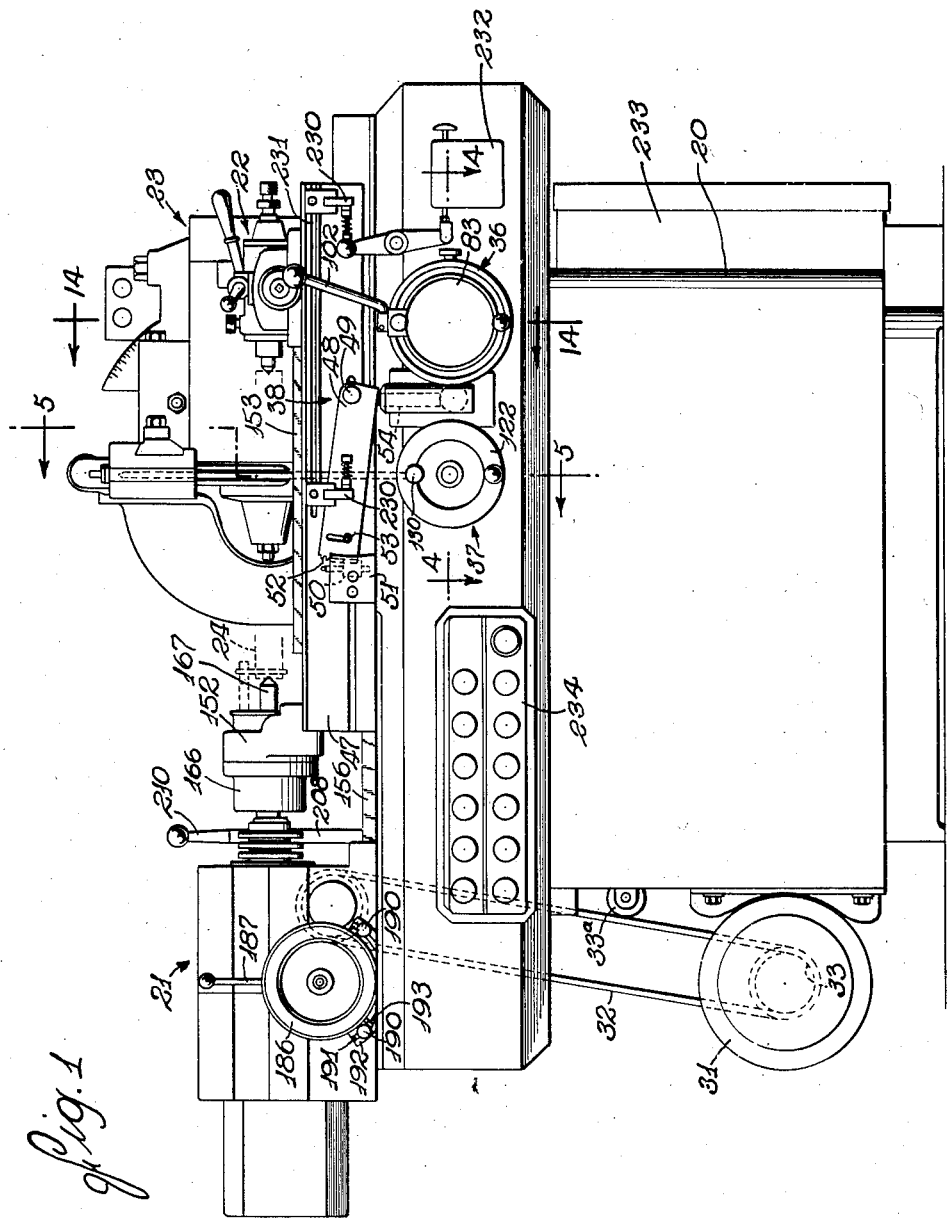
Figure 1 is a front elevation of a machine tool embodying the features of the invention.

Fig. 14 is a transverse sectional view of the machine taken along the line 14—14 of Fig. 1.

The present machine, in its illustrated embodiment, has a machine base 20 which supports a work head or headstock 21 on its upper left-hand end (Figs. 1, 2 and 3) and a tailstock 22 toward its right end. A grinding wheel assembly, generally designated 23 is located rearwardly of a piece of work 24 supported by the head and tailstocks. The workpiece is rotatably driven and is translated across the plane of the grinding wheel, and the grinding wheel is mounted for adjustment and operative movement toward and away from the workpiece. A dressing device 25 is located rearwardly of the grinding wheel assembly for movement to dispose the dressing points in dressing engagement with the wheel periphery. A driving motor 26 on the rear side of the base is connected by a belt 27 with a drive shaft or spindle 28 for the grinding wheel, and a motor 29 also located at the rear of the base is connected by a flexible shaft 30 with the driven elements of the dressing device. A motor 31 (Fig. 2) is connected by a belt drive 32 and stepped cone pulleys 33 with a drive shaft 34 (Figs. 9 and 10) for the work shaft 35.

The relationship of the grinding wheel and the dressing device and of the grinding wheel and the work is controlled simply and conveniently from the operator's station at the front of the machine. The controls include a feed control means, generally designated by the numeral 36, by which the operator may set the machine to produce a predetermined depth of cut in the workpiece, control the feed of the grinding wheel into the workpiece, or quickly retract the grinding wheel out of engagement therewith. The controls also include a dressing device control means, generally designated 37, by which a dressing relationship of the dressing device to the grinding wheel is obtained, and this control also includes means for effecting a compensating adjustment of the grinding wheel to the workpiece, whereby an initial relation of the grinding wheel and workpiece remains fixed regardless of the number of dressing operations or the variation in the diameter of the grinding wheel resulting from the removal of material in the dressing operation. The controls further include means, designated generally at 38, for adjusting the machine to grind straight or tapered screw threads. These controls, as will hereinbefore be more particularly described, are interrelated by a novel arrangement of three superimposed slides having conjoint as well as relative movement and include, as shown in Fig. 5, a lower slide 39, an intermediate slide 40 and an upper slide 41. The slides for convenience will hereinafter be termed the taper slide 39, the wheel slide 40 and the dresser slide 41. The three slides have parallel movement in a front to rear direction of the machine base or along a line transverse to the line of movement of the workpiece. Thus, as shown in Fig. 12, the base has a plate 42 (see also Fig. 5) rigidly secured thereto beneath the taper slide 39 and ways 43 on the plate support the taper slide 39. On the upper surface of the taper slide are ways 44 supporting the wheel slide 40 and on the upper surface of the wheel slide are ways 45 supporting the dresser slide 41.

Figure 4:
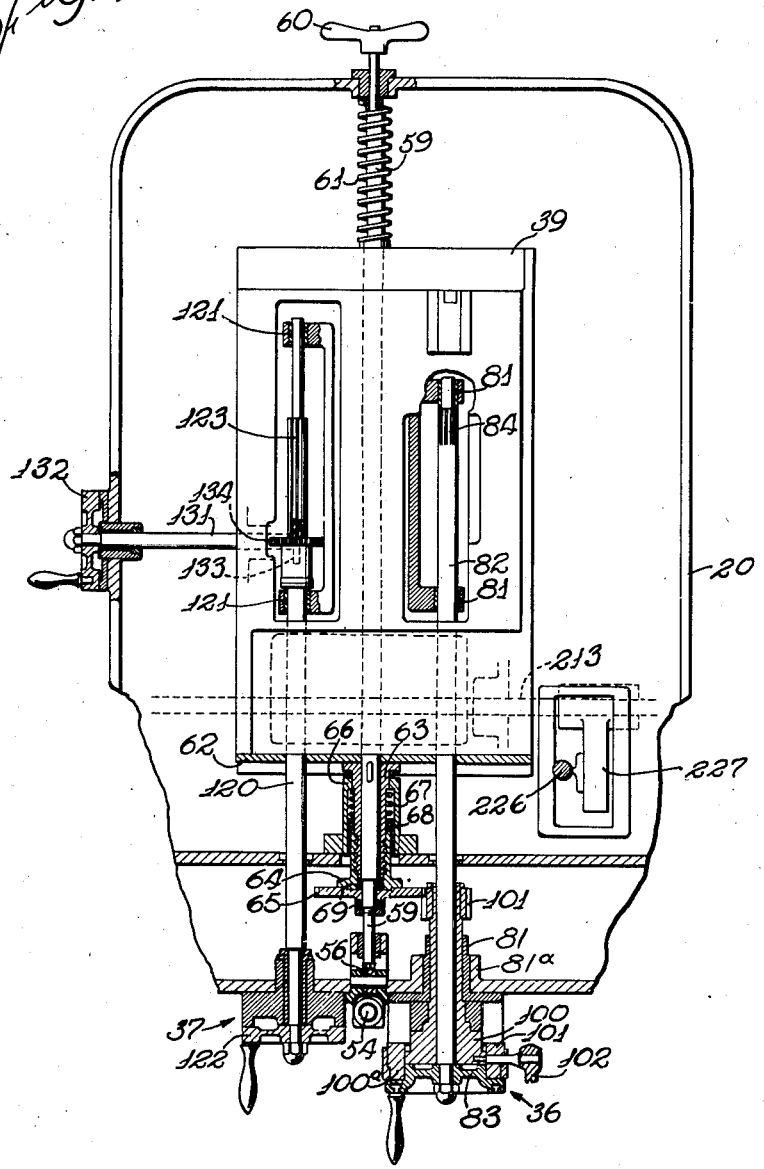
Fig. 4 is a horizontal sectional view of a part of the machine taken along the line 4—4 of Fig. 1.

The means by which the taper slide is moved in accordance with the slope of a taper on the workpiece will be described with particular reference to Figs. 1, 4 and 6. On the upper surface of a base is a work slide 47 having a longitudinal reciprocatory movement as will hereinafter be explained to feed the workpiece in a path paralleling generally the axis of the grinding wheel. The front face of the work slide 47 has a sine bar 48 pivoted thereto by a horizontal pivot 49 extending through one end of the sine bar. The sine bar is adjustable to vary its angle of inclination relative to the line of reciprocatory movement of the work slide 47 by such means as a worm 50 supported in a housing 51 on the work slide for engagement with a rack segment 52 on the free end of the sine bar. Such means as a shoulder screw locking means 53 engaging the work slide 47 and extending through a coacting arcuate slot in the end of the sine bar may be employed to secure the sine bar in any position of adjustment. The lower side of the sine bar 48 in its movement with the work slide 47 rides over the upper end of a vertically slidable plunger 54 (Fig. 6) supported by a bearing 55. The lower end of the plunger engages one arm of a bell crank lever 56 which is pivoted, as at 57, to a support 58, the other end of the bell crank lever being in engagement with the front end of a rod 59 that, as shown in Fig. 4, extends rearwardly through the taper slide 39 and through the rear side of the base.

A wing nut 60 engages the rearwardly projecting end of the shaft 59 and a spring 61 encircles the rear portion of the shaft between the rear wall of the base and the adjacent side face of the taper slide 39. This spring is tensioned to urge the slide forwardly. Extending across the front of the taper slide is a wiper plate 62 having an elongated sleeve 63 secured thereto and encircling the rod 59. The forward end of the sleeve 63 has external screw threads thereon for engagement by a nut 64 which is rigid with a gear 65. An elongated collar 66 secured to the sleeve 63 encloses the end of the nut 64 as well as a spring 67 which is seated against a shoulder on the sleeve 63 and exerts its force against the end of the nut 64 through a thrust washer 68. Movement of the nut 64 and gear 65 axially of the rod 59 is prevented by thrust bearings 69 fixed on the rod 59 on opposite sides of the gear 65. Movement of the sine bar with the work table 47 will effect a corresponding horizontal movement of the taper slide.

Rotation of the gear 65, by means to be described, will move the taper slide rearwardly or return it to a predetermined position relative to the rod 59. The screw threads on the nut 64 and collar 63 preferably have a coarse pitch to produce movement through a fairly wide range by limited rotation of the gear 65. This movement by the gear 65 is incidental to and independent of movement transmitted to the taper slide by the sine bar. The wing nut 60 limits the forward movement of the taper slide and may be used to render the sine bar ineffective (as when grinding straight threads) by turning the wing nut to draw the rod 59 rearwardly against the tension of the spring 61 to a position in which the front end thereof cannot be engaged by the bell crank.

The control means 36 includes one means for adjusting the grinding wheel in proper relation to the workpiece to produce the finish size or depth of cut desired and another means acting through the gear 65 and nut 64 to retract or advance the grinding wheel out of or into engagement with the workpiece. The adjusting means is best seen in Figs. 4, 8 and 14.

Rotatably supported by bearings 81 on the plate 42 and in a boss 81ᵃ on the front wall of the base is a shaft 82 which extends slidably and rotatably through the front portion of the taper slide. Beyond the front wall of the base the shaft has a hand wheel 83 fixed thereto. The shaft near its rear end has an elongated spur gear 84 thereon for engagement with a spur gear 85 on a lead screw 86 (Fig. 14) which extends rearwardly and is journaled as at 87 for rotation without axial play in a boss 88 extending upwardly from the taper slide 39. The rear end of lead screw 86 is threaded in a nut 89 which is rotatably supported without axial play by a boss 90 depending from the wheel slide 40.

Rotation of the shaft 82 by rotation of the hand wheel 83 at the operator's station will through gears 84, 85 rotate the lead screw 86 in the nut 89 to move the wheel slide 40 transversely to the workpiece. This adjustment enables the operator to set the wheel slide at the position which determines the final or finished size of the workpiece. The nut 89 has on its rear end a spur gear 91 the purpose of which will presently be described.

Associated with the size control shaft 82 is manual control means for moving the taper slide 39 by rotation of the gear 65, this movement being utilized to retract the grinding wheel wholly or partially from a workpiece and to advance the grinding wheel to engage the workpiece or to feed the grinding wheel incrementally into the workpiece until the grinding wheel has cut to finished size. Thus, referring to Figs. 4 and 14 sleeve 100 encircles the front end of shaft 82 rearwardly of the hand wheel 83 and is elongated to extend through the front bearing 81 in the boss 81ᵃ on the base. At its rear end within the base the sleeve 100 carries an elongated gear 101 in mesh with the gear 65 carried on the taper slide rod 59. Adjoining the hand wheel an enlarged ring 100ᵃ is secured to the sleeve 100 to support a hand lever 102 (Figs. 1 and 4) by which the sleeve 100, the gears 101, 65 and the nut 64 may be rotated to retract or advance the taper slide 39.

Since the grinding wheel assembly 23 is mounted on the taper slide 39 such movement will vary the position of the grinding wheel with respect to its position when adjusted to finish size of cut. Thus the grinding wheel may be quickly withdrawn from the work at the end of a cut for replacement of the workpiece or at any time to dress the grinding wheel and such withdrawal does not alter or disturb the initial adjustment for size obtained through shaft 82. Preferably suitable stops (not shown) are provided to limit the handle movements 102 to an arc which will produce a travel of the taper slide only slightly greater than that necessary to retract the grinding wheel periphery to clear the greatest depth of thread which will be cut.

The grinding wheel assembly 23 includes a wheel head 110 (Fig. 12) in which the drive shaft 28 for the grinding 111 is journaled. The wheel head is suitably mounted on the wheel slide 40 for angular adjustment of the grinding wheel in conformity with the helix angle of the thread being cut on the workpiece. The driving motors 26, 29 for the grinding wheel shaft and the dressing device respectively are mounted on the wheel slide 40 near the rear end thereof. The dressing device is mounted on the dresser slide 41 behind the grinding wheel 111 and the mounting includes a cradle or slide 112 (Fig. 5) for effecting proper alinement of the dressing points with the rear edge of the grinding wheel.

The dresser slide control 37 includes means for moving the dressing device on the wheel slide into dressing relation with the cutting surface of the grinding wheel and also for shifting the wheel slide and dresser slide as a unit to compensate for removal of wheel material during the dressing operation and maintain the initial size of cut adjustment. Referring to Figs. 4 and 5 the control means 37 for the dressing mechanism includes a shaft 120 extending rearwardly from the operator's station in front of the machine into the taper slide 39 where its rear portion is supported by spaced bearings 121 on the plate 42. The shaft is rotatably and slidably supported by the taper slide 39 and an operator's hand wheel 122 is secured to its front end. Along its rear portion the shaft has an elongated spur gear 123 engaged by a spur gear 124 secured to the front end of a shaft 125 having a feed screw thread 126 formed thereon. The shaft 125 is rotatably supported without axial play by bearings 127 on the wheel slide 40. The feed screw 126 is engaged by a nut 128 carried by an arm 129 depending from the dresser slide 41. Thus movement of the dresser slide to effect a dressing engagement of the dressing points (one of which is indicated at 25ª in Fig. 5) with the rear side of the grinding wheel 111 may be obtained by rotation of the hand wheel 122 and any desired relationship may be maintained by suitable locking means 130.

For the convenience of the operator in setting up the machine from the left-hand end thereof, supplemental means for rotating the shaft 120 may be provided. This means, as shown, comprises a cross shaft 131 rotatably mounted on the base to extend from beneath the shaft 120 through the left end of the base. The outer end of the cross shaft has a hand wheel 132 thereon and the inner end carries a spiral or skew gear 133 meshing with a similar gear 134 on the shaft 120.

The manual machine controls which have been described enable the operator to set the machine to cut to size or depth, to move the dressing device into dressing engagement with the grinding wheel and to shift the grinding wheel and dressing device as a unit toward and away from the workpiece. Referring to Figs. 5, 7 and 8, the means for compensating for the variation in the grinding wheel diameter resulting from the dressing operations whereby to maintain constant the original setting determining the finish size or depth of cut includes, in the present instance the following arrangement: The rear end of the dresser slide control shaft 125 has a spur gear 140 secured thereon which through a pair of intermediate pick-off idler gears 141, 142 (Fig. 7) drive the gear 91 on the rotatable nut 89. This nut (as previously described) is rotatably mounted without end play on the wheel slide 40 and engages the feed screw threads on the shaft 86 carried by the taper slide. Thus, when the dresser slide 41 is moved toward or away from the grinding wheel 111 the rotary movement of the shaft 125 also drives the nut 89 through gears 140, 141 and 142 to move the nut along the stationary shaft 86, thereby shifting the wheel slide in the direction of the dresser slide movement. The arrangement is such that the wheel slide 40 is moved through the distance required to maintain the initial size or depth of cut relation between the grinding wheel and the work. In other words, when the dresser slide 41 moves relative to the wheel slide 40, the wheel slide also moves an equal distance (carrying with it the dresser slide) to compensate for the reduction in wheel radius by the removal of material from the grinding wheel in dressing it. One of the idler gears 141 or 142 may be disengaged to enable the operator to initially adjust the dressing device along the wheel slide without movement of the latter.

The supporting and driving means for the workpiece includes means for rotating the workpiece and for translating it with a feed movement past the grinding wheel 111. Also included is means actuated in timed relation to workpiece rotation for advancing and retracting the grinding wheel relative to the workpiece for relief cutting as in grinding taps or hobs.

Referring to the machine structure which supports and drives the workpiece, a plate 150 (Figs. 5 and 14) along the front side of the base has adjustable opposed V-shaped ways 151 which, through interposed roller elements, support the work slide 47 for reciprocatory movement.

Extending upwardly and rearwardly from the left-hand end of the work slide is a pedestal 152, the purpose of which will be presently described. The upper surface of the work slide is provided with ways 153 for adjustably supporting the tailstock 22. The headstock or work head structure 21 includes, as may be seen in Figs. 1, 2, 3, 9 and 10, a housing 155 which is supported by side and bottom guideways 156 on the base for adjustment along the line of movement of the work slide. Suitable lock means 157 (Fig. 9) secure the work head in an adjusted position. To maintain the driving belt 32 taut in the various positions of adjustment of the work head, such means as an adjustable idler pulley 33ª (Fig. 2) may be employed.

The shaft 34, as shown in Fig. 10, extends into the lower portion of the housing 155 and is rotatably supported therein by spaced bearings 158. Centrally of the housing the shaft 34 has a worm 159 keyed thereto for engagement with the worm wheel 160 secured to a flange 161 on an elongated sleeve 162 which slidably encircles the work shaft 35. Such means as a sliding feather key 163 drivingly connects the sleeve and shaft. One end of the shaft 35 (the right-hand end as shown in Fig. 9) extends through a dust seal 164 at the end of the sleeve and is supported by combined radial and thrust bearings 165 in a housing 166 which is secured to the end of the pedestal 152. A live center 167 on the shaft 35 (Fig. 9) extends beyond the housing 166 for engagement with the workpiece.

At its opposite end the shaft 35 is of reduced diameter to receive an elongated sleeve or shell 168 which is keyed to the shaft as at 169 and is detachably secured thereon by cap screw and washer means 170. Externally the collar 168 has precise lead screw threads 171 thereon and the sleeve illustrated is one of a series of interchangeable sleeves which differ from each other in the pitch of the thread either in a right-hand or left-hand direction. A slidable nonrotatable frame 172 has secured thereto, as shown in Fig. 11, a split nut 173 constituting a master lead nut engageable with the lead screw on the sleeve 168. The nut is also interchangeable.

Fixed on the inner end of the frame is a centrally apertured disk 174 through which the shaft 35 extends. A flanged collar 175 encircles the shaft 35 and extends through the aperture in the disk 174 to dispose the collar flange 176 behind the disk. Between the disk 174 and the flange is a thrust washer 177 and on the other side of the disk is another thrust washer 178 abutted by a spacing ring 179 which is in turn engaged by a ring 180 carrying a worm gear 181. A nut 182, engaging external screw threads on the collar 175, abuts the ring 180 to establish a driving relation between the worm wheel 181 and the collar 175, as well as to bind the disk 174 between the thrust washers 177, 178 and against the flange 176. The external screw threads on the collar 175 engage an internally screw threaded member 183 which is fixed to the housing 155.

The worm wheel 181 is engaged by a worm 184 on a shaft 185 which is journaled on the housing and extends through the front side thereof, and a wheel 186 having an operating handle 187 is secured to the front end of the shaft. The numeral 189 (Fig. 9) designates bearings in the housing 155 for supporting the shaft 35 and its associated mechanism.

In operation, the housing 155 is adjusted longitudinally of the base to dispose the workpiece between the head and tailstock centers substantially in proper relation to the grinding wheel. A more accurate relation is obtained by rotation of the wheel 186 which, through shaft 185, worm 184, worm wheel 181, rotates collar 175 to shift it longitudinally of the work head casing 155. Since the sliding frame 172 is connected through disk 174 with the collar 175, axial movement of the latter will shift the frame 172, thereby moving the master lead screw and nut and the shaft 35 axially. Such axial movement of the shaft 35 is transmitted to the worktable and tailstock thereon through the pedestal 152 to adjust the position of a workpiece mounted between the head and tailstock centers with respect to the grinding wheel.

The means just described, after the initial adjustments have been made, may be used to "pick up" the lead on successive workpieces at the beginning of a cutting operation.

Machines of the type here under consideration may be arranged to perform a cutting operation during movement of the workpiece past the grinding wheel in either direction. It is impossible to eliminate entirely backlash or play in the mechanism which feeds the workpiece and compensation must be made for such backlash at the beginning of each reversal of movement. In this embodiment the same mechanism for shifting the shaft 35 axially is used to compensate for backlash. Thus, a pair of stops 190 (Fig. 1) is mounted for adjustment along an arcuate slot 191 on a bracket 192 adjacent to the periphery of the wheel 186 for engagement by a pin 193 projecting radially outwardly from the wheel to limit the extent of wheel movement. By properly determining the amount of backlash in any given assembly and by adjusting the stops 190 to limit movement of the wheel 186 through an arc which will produce a commensurate backlash compensating movement of the shaft 35, the operator may effect compensation merely by rotating the wheel 186 from one stop to the other at each reversal.

The means in the present machine for moving the grinding wheel for relief or backoff grinding of such cutting tools as taps, hobs, and the like, will be described with reference to Figs. 2, 3, 9, 12, 13 and 14. As shown in Fig. 9, the collar 162, through which the shaft 35 is driven, has a series of cams 200, 201, 202 keyed thereto externally of the housing 155 and held in place by a nut 203. These cams may be termed relieving cams and are formed with various numbers of lobes equal to the number of flutes which are to be relief ground. The cams are shaped to produce the required movement of the grinding wheel.

Figure 2:
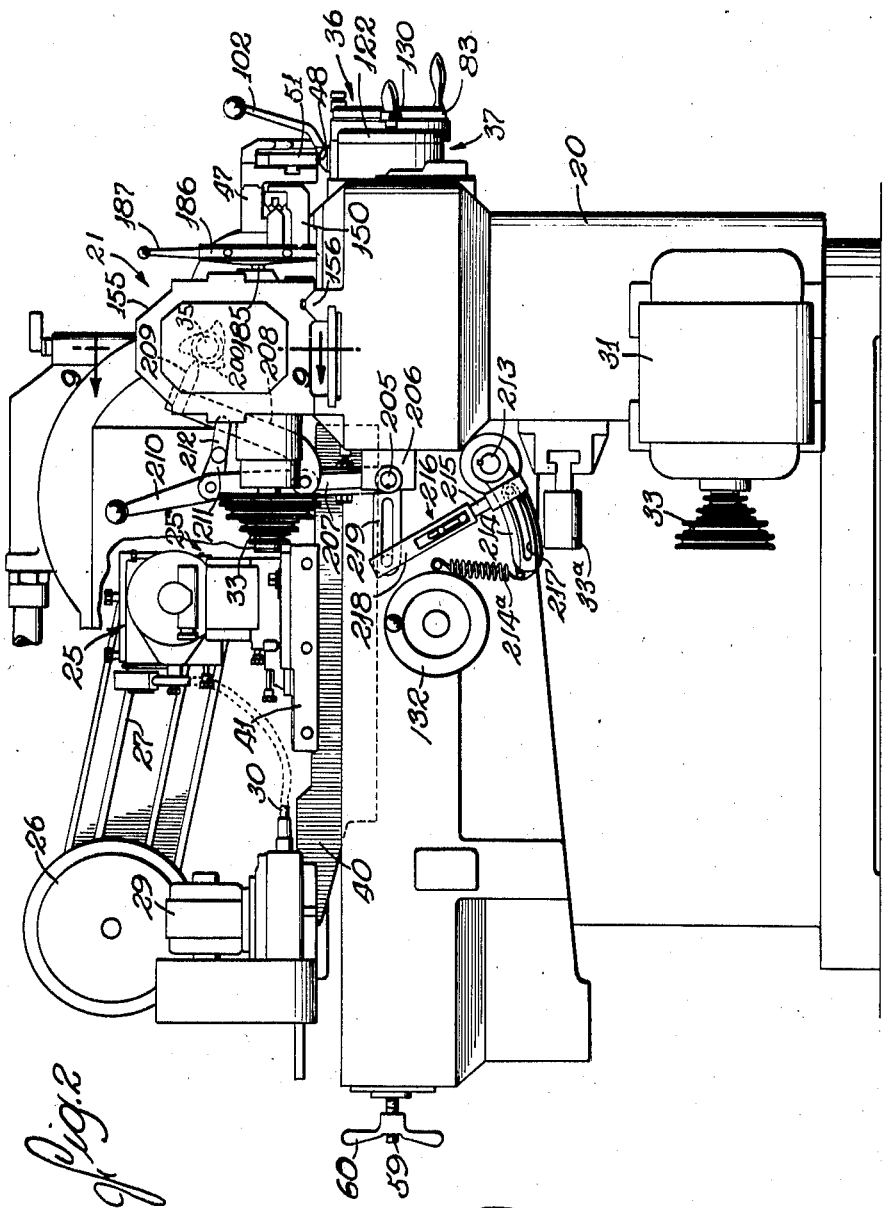
Fig. 2 is a side elevation of the machine as seen from the left-hand end of Fig. 1.

Referring to Fig. 2, a rock shaft 205 is mounted in bearings 206 to extend along and below the work head 155 in a direction parallel to the line of adjustment of said head. Slidably mounted on the rock shaft 205, as by a feather key, is an upstanding lever 207. Suitable means, not shown, is provided for securing the lever to the rock shaft at various positions along the length thereof. Pivoted intermediate the ends of the lever 207 is an arm 208 which extends upwardly at an acute angle to the lever. A cam follower 209 is mounted on the upper end of the arm 208 for engagement with one or another of the relieving cams 200, 201 and 202, as determined by the position of the lever 207, on the rock shaft 205. Pivoted on the upper end of the lever 207 is a bell crank lever having a long arm 210 upstanding to provide a handle and a short arm 211 extending toward the cam follower arm 208.

The end of the arm 211 is connected by a link 212 with the arm 208 to provide a toggle. The arrangement is such that when the handle arm 210 of the bell crank lever is in its forward position (toward the right in Fig. 2), the toggle is extended with the center pivot of the toggle slightly past dead center. In this relationship, movement of the cam follower arm 208, produced by the cam with which the follower 209 is associated, will be transmitted to the lever 207. Rearward movement of the handle 210 will break the toggle alinement and withdraw the cam follower 209 to an inoperative position which is fixed regardless of the position of the cams at the time of withdrawal. The selective association of the cam follower with any cam in any position of adjustment of the work head is effected by adjustment of the lever 207 along rock shaft 205.

The cam induced movements of the work shaft 205 are transmitted to a second rock shaft 213 by means which is adjustable through a wide range to determine the ratio of movement between the rock shafts 205 and 213, as well as the rotative position of the rock shaft 213. The rock shaft 213 is journaled on the machine base to extend longitudinally thereof to a position beneath the grinding wheel spindle assembly. On its outer or left-hand end the shaft has an arm 214 secured thereto. A section 215 of an extensible link 216 is adjustably secured to the arm along the length of an arcuate slot 217 therein. The other section 218 of the link 216 has an adjustable connection with a slotted arm 219 secured to the rock shaft 205. By adjustment of the length of the link 216 and of the relationship of the ends of the link to the arms 214 and 219, substantially any required extent of movement of the rock shaft 213 may be obtained. Spring means 214ª connected to the end of the lever 214 and to the base exerts a force in a direction tending to hold the cam follower 209 in cam engagement.

This movement of the rock shaft 213 advances or retracts the grinding wheel relative to the workpiece and in timed relation to the rotational movement of the workpiece. Referring to Figs. 12, 13 and 14, the grinding wheel spindle or drive shaft 28 is supported by bearings 220 in a spindle casing 221 which extends through an eccentric bore in a carrier 222. The carrier is supported for oscillatory movement by the wheel head 110. The wheel head has a circumferentially extending slot 223 (Fig. 13), and the short end of an angular arm 224 rigid with the carrier 222 extends through the slot. The outer longer end of the arm extends along the wheel housing and at its end has a ball and socket connection, indicated at 225, with the upper end of a link 226. The link is adjustably secured at its lower end to an arm 227 fixed on the rock shaft 213. Hence, rocking movement of the shaft 213 will oscillate the collar 222 which movement, because of the eccentric relation of the shaft 28 to the carrier 222, will produce a desired reciprocatory relieving movement of the grinding wheel with respect to the workpiece.

In describing generally the operation of the machine, it will be presumed that a cut has been completed and a worn grinding wheel is to be replaced with a new one. The operator, by means of the dresser control 37, effects withdrawal of the dressing device and the grinding wheel to provide clearance for the new grinding wheel to be mounted on the grinding wheel spindle. After a new grinding wheel has been installed, it may be necessary to reposition the dressing device with respect to the grinding wheel periphery. This is done by interrupting the driving connection between the dresser slide feed screw 126 and the wheel slide 40 through disengagement of one of the idler gears 141, 142 to permit the position of the dresser slide 41 to be adjusted with respect to the stationary wheel slide. Once a proper dressing relationship has been established and the drive connection between the dresser slide feed screw and the wheel slide reengaged, further adjustment of this relationship is unnecessary.

If straight threads are to be ground the wing nut 60 is turned to withdraw the rod 59 to interrupt the driving connection thereof with the sine bar 48. If a taper thread is to be ground, the sine bar is moved to that angular relationship with respect to the line of travel of the work table which will produce a movement of the taper slide commensurate with the angle of the taper to be cut.

By means of the size control wheel 83, the operator moves the wheel slide 40 relative to the taper slide 39 to a forward position at which the grinding wheel will cut the workpiece to a desired size or depth. This is a fixed position of adjustment that is not disturbed during the operation of the machine on a succession of similar workpieces. It should be understood that when the adjustment for size of the finished cut is made, the nut 64 and the collar 63 are so related that the taper slide is in its foremost position.

After the adjustment for size of the finished cut has been made, the grinding wheel is retracted from this position of adjustment by manipulation of the quick retracting means controlled by the handle 102. This manipulation of the handle quickly moves the taper slide 39 rearwardly carrying with it the wheel and dresser slides 40, 41. The operator may then start the grinding operation, during which the inward feeding movement of the grinding wheel is controlled by movement of the handle 102 in a reverse direction during successive passes of the work relative to the grinding wheel. If only a single pass is to be made, the grinding wheel will be moved to its final depth of cut position at the beginning of the cutting operation. At any time the cutting operation may be instantly discontinued by manipulation of the handle 102 to retract the wheel. To dress the grinding wheel, it is first retracted in the manner described and the dressing device is advanced toward the grinding wheel by rotation of the dresser feed wheel 122. Because of the driving connections which advance the grinding wheel relative to the work a distance equal to the advance of the dressing device toward the grinding wheel, the initial adjustment for size or depth of cut is maintained regardless of the decreasing diameter of the grinding wheel resulting from repeated dressing operations.

It will be understood that in addition to the preliminary machine adjustments above described, various adjustments of the elements associated with the work head will be made before starting a grinding operation. Thus, a longitudinal adjustment of the work head along its ways 156 is made and a feed screw sleeve 168 and nut 173, having the required right or left-hand screw threads of desired pitch are assembled on the work shaft 35. An adjusted position of the work shaft to correlate properly the position of a workpiece to the grinding wheel is made by movement of the wheel 186, and the stops 190 are arranged to define the arc of movement of wheel 186 required to compensate for backlash or play in the work shaft assembly. The lever 207 is adjusted relative to the rock shaft 205 to engage cam follower 209 with the proper one of the cams 201, 202 or 203 and the connections between the rock shafts 205 and 213, and between rock shaft 213 and the arm 224, are adjustably fixed to effect oscillation of the grinding wheel spindle in properly timed relation to the workpiece for making a relief cut.

It will be noted that the oscillating movement of the grinding wheel spindle in relief grinding is independent of the various movements of the grinding wheel with the taper or wheel slides. Prior to a dressing operation, the handle 210 of the bell crank lever, which controls the engagement between a relieving cam and the cam follower, is moved to retract the cam follower. The limit of the retractive movement, as determined by the full rearward movement of handle 210 and lever 207, is fixed so that before the wheel is dressed the means controlling the position of the grinding wheel during relief cutting will be returned to a predetermined position before the dressing operation takes place.

Limit dogs 230 (Fig. 1) adjustable along a slot 231 on the work table may be provided for actuating a limit switch 232 which, through a reversing starter mechanism (not shown) located in a base section 233, controls the reversal of motor 31 at each end of a traverse of the workpiece past the grinding wheel. The various machine control switches may be conveniently mounted on a panel 234 on the front of the base.

It will be evident that the present machine embodies control means for adjusting the machine elements to operative relations that are not changed during machine operation and other control means for manually controlling the operative movements of the various elements during a grinding operation. All of the control means are accessible from the operator's station at the front of the machine. The present machine accordingly is unusually versatile in its adaptability to meet various grinding problems.

I claim as my invention:

1. In a grinding machine, in combination, a base, a first slide reciprocably mounted thereon, means for rotatably supporting a workpiece on said slide for axial traverse therewith, a second slide, a third slide, a fourth slide, means for supporting said second, third and fourth slides in operative relation to said first slide for reciprocation transversely thereof, a rotatably driven grinding wheel mounted on said third slide for cutting engagement with said workpiece, wheel truing means mounted on said fourth slide for dressing the cutting surface of said grinding wheel, means operatively interconnecting said base and said second, third and fourth slides including means for moving said third and fourth slides as a unit with said second slide to advance or retract said grinding wheel relative to said workpiece, means for moving said third and fourth slides as a unit relative to said base upon movement of said third slide relative to said second slide, means for moving said fourth slide relative to said base through a selected distance and for simultaneously moving said third slide relative to said base through a distance having a predetermined relation to said selected distance, and separate means for reciprocating said first slide including means for rotating said workpiece.

2. In a grinding machine, in combination, a base, a first slide reciprocably mounted thereon, means for rotatably supporting a workpiece on said slide for axial traverse therewith, a second slide, a third slide, a fourth slide, means for supporting said second, third and fourth slides in operative relation to said first slide for reciprocation transversely thereof, a rotatably driven grinding wheel mounted on said third slide for cutting engagement with said workpiece, wheel truing means mounted on said fourth slide for dressing the cutting surface of said grinding wheel, manually controlled means for moving said second, third and fourth slides relative to the base, means for moving said third and fourth slides as a unit relative to said second slide, and means for simultaneously moving said third slide relative to said second slide and said fourth slide relative to said third slide including means for maintaining said simultaneous movements at a predetermined ratio.

3. In a grinding machine, in combination, a base, a first slide reciprocably mounted thereon, means for rotatably supporting a workpiece on said slide for axial traverse therewith, a second slide, a third slide, a fourth slide, means for supporting said second, third and fourth slides in operative relation to said first slide for reciprocation transversely thereof, a rotatably driven grinding wheel mounted on said third slide for cutting engagement with said workpiece, wheel truing means mounted on said fourth slide for dressing the cutting surface of said grinding wheel, means for moving said second, third and fourth slides relative to the base to vary the operative relation of the grinding wheel relative to the workpiece, means for moving said third and fourth slides relative to said second slide, and means including two optionally operated controls for simultaneously moving said third slide relative to said second slide and said fourth slide relative to said third slide.

4. In a grinding machine, in combination, a base, a first slide reciprocably mounted thereon, means for rotatably supporting a workpiece on said slide for axial traverse therewith, a second slide, a third slide, a fourth slide, means for supporting said second, third and fourth slides in operative relation to said first slide for reciprocation transversely thereof, a rotatably driven grinding wheel mounted on said third slide for cutting engagement with said workpiece, wheel truing means mounted on said fourth slide for dressing the cutting surface of said grinding wheel, means for moving said second, third and fourth slides as a unit to vary the operative relation of the grinding wheel to the work, means for moving said third and fourth slides as a unit relative to said second slide, and means for simultaneously moving said third slide relative to said second slide and said fourth slide relative to said third slide, said simultaneous movements being equal.

5. In a grinding machine, in combination, a base, a first slide reciprocably mounted thereon, means for rotatably supporting a workpiece on said slide for axial traverse therewith, a second slide, a third slide, a fourth slide, means for supporting said second, third and fourth slides in operative relation to said first slide for reciprocation transversely thereof, a rotatably driven grinding wheel mounted on said third slide for cutting engagement with said workpiece, wheel truing means mounted on said fourth slide for dressing the cutting surface of said grinding wheel, means for jointly moving said second, third and fourth slides to determine the operative relation of the grinding wheel to the workpiece, means for unitarily moving said third and fourth slides relative to said base upon movement of said third slide relative to said second slide, and means for moving said fourth slide relative to said base through a selected distance and simultaneously moving said third slide relative to said base through a distance equal to one-half of said selected distance.

6. In a grinding machine, in combination, a base, a first slide reciprocably mounted thereon, means for rotably supporting a workpiece on said slide for axial traverse therewith, a second slide, a third slide, a fourth slide, means for supporting said second, third and fourth slides in operative relation to said first slide for reciprocation transversely thereof, a rotatably driven grinding wheel mounted on said third slide for cutting engagement with said workpiece, wheel truing means mounted on said fourth slide for dressing the cutting surface of said grinding wheel, means for moving said second, third and fourth slides relative to the base including means for moving said third and fourth slides as a unit relative to the second slide to determine a size of cut relationship of the grinding wheel to the workpiece, means for moving said fourth slide relative to said second slide to move said wheel truing means into or away from operative association with said grinding wheel and for simultaneously moving said third slide relative to said base to shift said grinding wheel toward or away from said workpiece, and quick retract means acting on said second slide to move said second, third and fourth slides relative to the workpiece.

7. In a grinding machine, in combination, a base, a first slide reciprocably mounted thereon, means for rotatably supporting a workpiece on said slide for axial traverse therewith, a second slide, a third slide, a fourth slide, means for supporting said second, third and fourth slides in operative relation to said first slide for reciprocation transversely thereof, a rotatably driven grinding wheel mounted on said third slide for cutting engagement with said workpiece, wheel truing means mounted on said fourth slide for dressing the cutting surface of said grinding wheel, means for moving said second, third and fourth slides relative to the base and to each other including means for moving said third and fourth slides as a unit to a position determining a finished size of cut on the workpiece, and means for moving said second, third and fourth slides as a unit to feed the grinding wheel into cutting engagement with the work.

8. In a grinding machine, in combination, a base, a first slide reciprocably mounted thereon, means for rotatably supporting a workpiece on said slide for axial traverse therewith, a second slide, a third slide, a fourth slide, means for supporting said second, third and fourth slides in operative relation to said first slide for reciprocation transversely thereof, a rotatably driven grinding wheel mounted on said third slide for cutting engagement with said workpiece, wheel truing means mounted on said fourth slide for dressing the cutting surface of said grinding wheel, means for moving said second, third and fourth slides relative to the base and to each other including means for moving said third and fourth slides as a unit to a position determining a finished size of cut on the workpiece, and means for moving said second, third and fourth slides as a unit relative to said position.

9. In a grinding machine, in combination, a base, a first slide reciprocably mounted thereon, means for rotatably supporting a workpiece for movement therewith, a second slide supported on said base for movement transversely of said first slide, a third slide mounted on said second slide for movement in a direction paralleling that of said second slide, a fourth slide mounted on said third slide for movement in a direction paralleling that of said third slide, a rotatably driven grinding wheel mounted on said third slide for movement therewith into and out of cutting engagement with a workpiece, wheel truing means mounted on said fourth slide for movement therewith into and out of operative engagement with the cutting surface of said grinding wheel, and means for moving said second, third and fourth slides relative to said base and to each other including means for moving said second slide and therewith the third and fourth slides as a unit relative to said base to vary the relation between the grinding wheel and workpiece, means for moving said third and fourth slides as a unit relative to said second slide, means for moving said fourth slide relative to said third slide and for simultaneously moving said third slide relative to said second slide through a distance which has a predetermined ratio to the distance through which said fourth slide is simultaneously moved relative to said third slide.

10. In a grinding machine, in combination, a base, a first slide reciprocably mounted thereon, means for rotatably supporting a workpiece on said slide for movement therewith, a second slide supported on said base for movement transversely of said first slide, a third slide mounted on said second slide for movement in a direction paralleling that of said second slide, a fourth slide mounted on said third slide for movement in a direction paralleling that of said third slide, a rotatably driven grinding wheel mounted on said third slide for movement therewith into and out of cutting engagement with a workpiece, wheel truing means mounted on said fourth slide for movement therewith into and out of operative engagement with the cutting surface of said grinding wheel, means for moving said third and fourth slides relative to the base to a position determining the finished size of cut on the workpiece, means for simultaneously moving said third and fourth slides relative to each other and to the base to dress the grinding wheel and restore the dressed wheel to said position including means for interrupting a part of the driving connection to effect movement of said fourth slide relative to the third slide while the latter is stationary, and means for moving said second, third and fourth slides as a unit.

11. In a grinding machine, in combination, a base, a first slide reciprocably mounted thereon, means for rotatably supporting a workpiece on said slide for axial traverse therewith, a second slide, a third slide, a fourth slide, means for supporting said second, third and fourth slides in operative relation to said first slide for reciprocation transversely thereof, a rotatably driven grinding wheel mounted on said third slide for cutting engagement with said workpiece, wheel truing means mounted on said fourth slide for dressing the cutting surface of said grinding wheel, means for moving said second, third and fourth slides relative to the base including means for moving said third and fourth slides as a unit relative to the second slide to determine a size of cut relationship of the grinding wheel to the workpiece, means for moving said fourth slide relative to said second slide to move said wheel truing means into or away from operative association with said grinding wheel, the movement of the grinding wheel relative to the base being one-half the movement of the wheel truing device relative to the base, and means for rapidly retracting or advancing said second, third and fourth slides as a unit.

12. In a grinding machine, in combination, a base, a first slide reciprocably mounted thereon, means for rotatably supporting a workpiece on said slide for axial traverse therewith, a second slide, a third slide, a fourth slide, means for supporting said second, third and fourth slides in operative relation to said first slide for reciprocation transversely thereof, a rotatably driven grinding wheel mounted on said third slide for cutting engagement with said workpiece, wheel truing means mounted on said fourth slide for dressing the cutting surface of said grinding wheel, means for moving said second, third and fourth slides as a unit including means connected with said second slide for imparting to said three slides a movement commensurate with a taper on the workpiece, and other means for rapidly moving said three slides independently of the first mentioned movement thereof.

13. In a grinding machine, a base, a work slide reciprocably mounted thereon, means on said work slide for rotatably supporting a workpiece for movement therewith in a direction axial of said workpiece, a wheel slide mounted for movement transversely of said work slide, a rotatably driven grinding wheel mounted on said wheel slide, a third slide interposed between said base and said wheel slide in support of said wheel slide, control means for moving said wheel slide to a predetermined finish size of cut position of adjustment with respect to the work, and other control means for moving said third slide and said wheel slide to shift the position of said grinding wheel with respect to said position of adjustment.

14. In a grinding machine, a base, a work slide reciprocably mounted thereon, means on said work slide for rotatably supporting a workpiece for movement therewith in a direction axial of said workpiece, a wheel slide mounted for movement transversely of said work slide, a rotatably driven grinding wheel mounted on said wheel slide, a third slide interposed between said base and said wheel slide in support of said wheel slide, control means for moving said wheel slide to a position of adjustment with respect to the work to determine the final size of cut, and other control means for moving said third slide and said wheel slide to shift the position of said grinding wheel with respect to said position of adjustment, including interengageable nut and screw members for moving said third slide and with it said second slide.

15. In a grinding machine, a base, a work slide reciprocably mounted thereon, means on said work slide for rotatably supporting a workpiece for movement therewith in a direction axial of said workpiece, a wheel slide mounted for movement transversely of said work slide, a rotatably driven grinding wheel mounted on said wheel slide, a third slide interposed between said base and said wheel slide in support of said wheel slide, control means for moving said wheel slide to a position of adjustment with respect to the work, other control means for moving said third slide and said wheel slide to shift the position of said grinding wheel with respect to said position of adjustment, including interengageable nut and screw members for moving said third slide and with it said second slide, and means connected with said third slide for moving said third and wheel slides in accordance with the slope of a taper on the workpiece.

16. In a grinding machine, a base, a work slide reciprocably mounted thereon, means on said work slide for rotatably supporting a workpiece for movement therewith in a direction axial of said workpiece, a wheel slide mounted for movement transversely of said work slide, a rotatably driven grinding wheel mounted on said wheel slide, a third slide interposed between said base and said wheel slide in support of said wheel slide, means connected with said third slide for moving it and the wheel slide as a unit in accordance with the slope of a taper to be cut, and other means also connected with said third slide for imparting additional movement to said third and wheel slides.

17. In a grinding machine, a base, a work slide reciprocably mounted thereon, means on said work slide for rotatably supporting a workpiece for movement therewith in a direction axial of said workpiece, a wheel slide mounted for movement transversely of said work slide, a rotatably driven grinding wheel mounted on said wheel slide, a third slide interposed between said base and said wheel slide in support of said wheel slide, control means for adjusting the position of said wheel slide with respect to said third slide, and means for moving both of said slides as a unit to follow a taper on the workpiece including a member movable with said third slide, a sine bar, a driving connection between said sine bar and said member, and means for retracting said member to interrupt said driving connection and condition the machine for making straight cuts on a workpiece.

18. In a grinding machine, a base, a work slide reciprocably mounted thereon, means on said work slide for rotatably supporting a workpiece for movement therewith in a direction axial of said workpiece, a wheel slide mounted for movement transversely of said work slide, a rotatably driven grinding wheel mounted on said wheel slide, a third slide interposed between said base and said wheel slide in support of said wheel slide, control means for adjusting the position of said wheel slide with respect to said third slide, and means for moving both of said slides as a unit to follow a taper on the workpiece including a member movable with said third slide, a sine bar, and means drivingly connecting said sine bar with said member, the connecting means including means for moving said third slide relative to said member.

19. In a grinding machine, a base, a work slide reciprocably mounted thereon, means on said work slide for rotatably supporting a workpiece for movement therewith in a direction axial of said workpiece, a wheel slide mounted for movement transversely of said work slide, a third slide intermediate said base and said wheel slide supporting said wheel slide, said third slide being movable on said base transversely of said work slide, a grinding wheel, means for supporting said grinding wheel on said wheel slide including a rotatably driven spindle, means for moving said spindle to shift said grinding wheel with respect to the workpiece in relief cutting including means adjustable to vary such spindle movement, retractible means for discontinuing such spindle movement and for disposing the grinding wheel in a predetermined position with respect to said wheel slide, means for moving said third slide and said wheel slides as a unit to retract said grinding wheel to a position remote from the workpiece, a dressing device mounted on said wheel slide for movement therewith and relative thereto, and means for moving said dressing device into dressing engagement with the grinding wheel and for simultaneously moving said wheel slide through a distance equal to the reduction in the radius of the grinding wheel resulting from the removal of material therefrom in the dressing operation.

20. In a grinding machine, a base, a work slide reciprocably mounted thereon, means on said work slide for rotatably supporting a workpiece for movement therewith in a direction axial of said workpiece, a wheel slide mounted for movement transversely of said work slide, a third slide intermediate said base and said wheel slide supporting said wheel slide, said third slide being movable on said base transversely of said work slide, a grinding wheel supported on said wheel slide for oscillatory movement for relief cutting, means for imparting such oscillatory movement to said grinding wheel in timed relation to workpiece movement including a plurality of means having correlated adjustments to vary the extent of such movement and means for discontinuing such movement and returning said grinding wheel to a predetermined position relative to said wheel slide, and means acting through said third slide for retracting said grinding wheel to a dressing position.

MAX A. MATHYS.